United States Patent Office 3,360,477
Patented Dec. 26, 1967

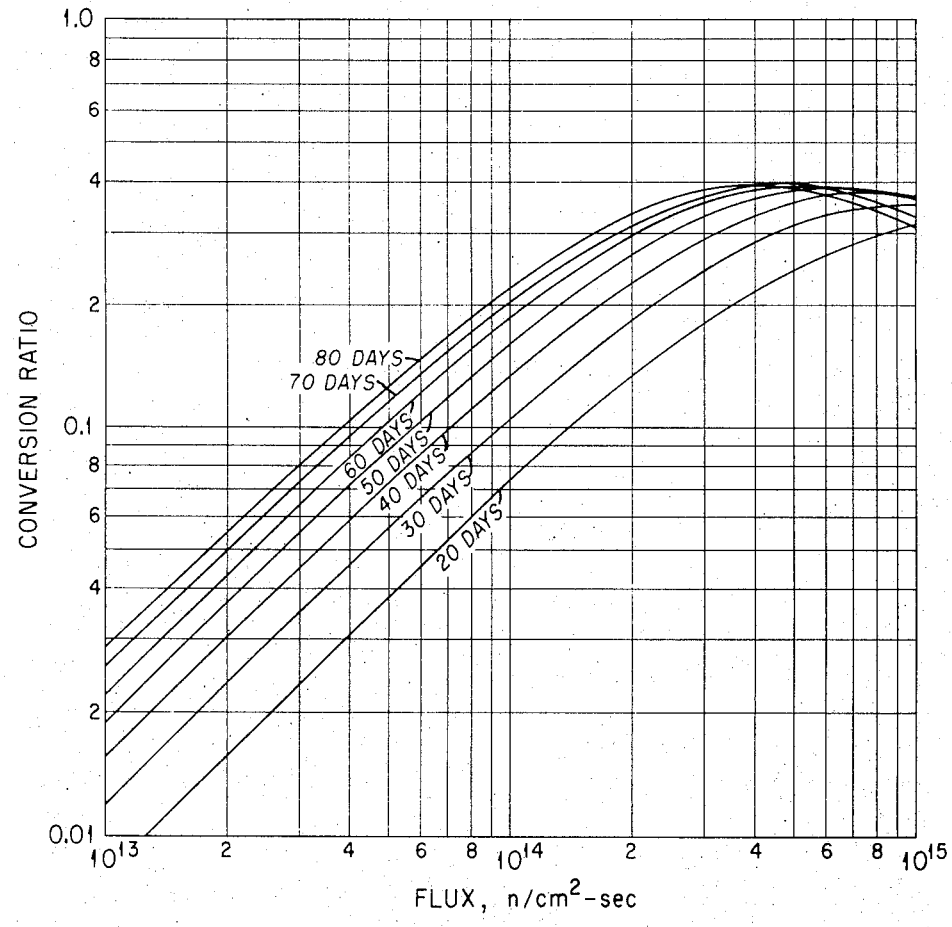

3,360,477
NEUTRON SOURCE
Elick H. Acree, Oak Ridge, and William G. Tatum, Lenoir City, Tenn., assignors to the United States of America as represented by the United States Atomic Energy Commission
Filed Feb. 26, 1965, Ser. No. 435,761
2 Claims. (Cl. 252—301.1)

This application is a continuation-in-part of application Ser. No. 343,423 filed February 7, 1964 and now abandoned. The present invention relates, generally, to methods for preparing neutron sources and more particularly to a novel high-output neutron source.

Heretofore various neutron sources have been utilized in the art and have generally been of two types: (1) an alpha-neutron reaction type in which an alpha emitting isotope is mixed with a metal which is capable of producing neutrons when exposed to alpha radiation and (2) a gamma-neutron reaction type in which a gamma emitting isotope is mixed with a metal which is capable of producing neutrons when exposed to gamma radiation. The gamma emitting isotopes of the latter type have generally been provided by converting a non-radioactive element, such as antimony, to a gamma emitting isotope by neutron bombardment, while the alpha emitting elements were naturally radioactive. Radioactive isotopes most commonly employed in the alpha-neutron reaction type neutron source have been $^{226}$Ra, $^{210}$Po, $^{239}$Pu and $^{241}$Am, and for the gamma-neutron reaction type source, artificially produced isotopes such as $^{124}$Sb and $^{140}$La. While each particular isotope has particular advantages in regards to the respective types of sources, none of the named isotopes have been completely suitable in preparing high-output neutron sources. For example, $^{226}$Ra-Be sources afford a high neutron output, but unfortunately pose serious radiation hazards as well as having an associated containment problem of confining highly radioactive decay products such as Radon.

Polonium-beryllium sources, while being a considerable improvement over the radium-beryllium sources by virtue of the large reduction of the gamma radiation problems, have not been without their serious drawbacks. Whereas the polonium-210, being an alpha emitter (specific activity $4.5 \times 10^3$ c./g.), can be handled by itself with only alpha shielding, copious neutrons are generated immediately upon mixing with beryllium which present a serious radiation hazard to the fabricating personnel, therefore requiring neutron shielding. This is especially acute when source outputs above $10^6$ n./sec. are required. Thus, in order to provide adequate safety precautions against undue neutron exposure during the mixing step, either expensive shielding facilities, such as hot cells, are necessary, or additional fabrication steps, i.e., the application to the polonium of a thin coat of metal which is later removed, may be used to absorb substantially all of the alphas produced, thereby precluding the generation of neutrons during mixing of the two constitutents. Moreover, such polonium-210–beryllium sources are relatively expensive. Polonium-210 may be obtained by extraction from pitchblende ($U_3O_8$) where it occurs to the extent of about 0.1 mg./ton or it may be artifically produced by neutron bombardment of bismuth-209. A large portion of the polonium-210 used in such sources is obtained in this latter manner; however, due to the low conversion rates of bismuth-209 to polonium-210 (milligram quantities from grams of bismuth, the polonium-210 must be separated from any unconverted bismuth to obviate inordinately large quantities of parent material being required for a given source. Accordingly, with such costly chemical reprocessing required, sources of this type are extremely expensive. For example, a polonium-210–beryllium neutron source having a neutron output of about $2.5 \times 10^7$ n./sec. will contain about 10 curies of polonium-210 and cost about $1400.

Plutonium-239 and americium-241, because of their long half-lives, give sources that require infrequent calibration; however, their low specific activities limit their neutron outputs. Additionally, sources prepared from artificially produced isotopes have, like sources employing radium-226, serious gamma problems, requiring radiation shielding during handling and transport of these sources. It may thus be seen that the art needs an inexpensive-to-fabricate, high-output neutron source which does not have all of the attendant problems, such as requiring radiation shielding during fabrication due to neutron and/or gamma radiation, of prior art neutron sources.

Accordingly, an object of the present invention is to provide a novel neutron source of the alpha-neutron reaction type.

Still another object is to provide a neutron source of the alpha-neutron reaction type wherein the neutron output is at least as great as $10^3$ times that of prior art $^{241}$Am-Be sources of the same quantities of non-irradiated americium-241 and target material.

In accordance with the present invention a high-output neutron source of the alpha-neutron reaction type is prepared by admixing a first radioactive element (parent material) which has a low specific activity and which is capable of being transmuted to an alpha particle emitting element of high specific activity by neutron bombardment, with a metal (target material) selected from the group consisting of boron and beryllium, which is capable of emitting neutrons when exposed to alpha radiation, both constituents being in amounts sufficient to produce a substantial neutron output upon subsequent irradiation. The admixture is then encased in a container and irradiated in a neutron flux for a period of time sufficient to convert a substantial portion of the first element to the alpha-emitting element, thereby producing a novel high-output neutron source. Neutron sources comprising americium-241–beryllium–curium-242 have yielded neutron outputs greater than $1 \times 10^7$ neutrons/second with as little as about 11 milligrams of americium-241, and are capable of producing a neutron output of $1 \times 10^9$ neutrons/second. In general, applicants have discovered that a given quantity of americium-241, if irradiated to produce curium-242 in accordance with this invention, will yield about one thousand times as many neutrons/second as the same quantity of non-irradiated americium-241. Sources are less expensive to make and simpler to fabricate according to this invention, with less attendant radiation hazard to fabricating personnel, than those of the prior art.

For purposes of illustrating a preferred embodiment of this development, an americium-241–beryllium–curium-242 neutron source will be hereinafter discussed.

Such sources may be made by first mixing one part by weight powered americium-241 with at least 10 parts by weight powdered beryllium metal, next pressing the mixture into a pellet, and then encapsulating the pellet in an aluminum container. The capsule containing the mixture is next irradiated in a neutronic reactor in accordance with a predetermined schedule of both time and neutron flux to convert the americium-241 to curium-242, which is a high specific activity alpha emitter (approximately 3300 curies/gram as compared with about 3 curies/gram for americium-241). Curium-242 is produced in this manner in accordance with the following general reactions:

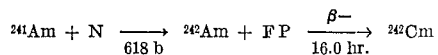

It will be appreciated by those skilled in the art that, inasmuch as americium-242 exists in two isomeric states, curium-242 production may be facilitated by either mode; however, it will be apparent that, due to the large difference in the half-lives of the two isomers, viz, 16 hours vs. 152 years, for the irradiation periods hereinafter disclosed the principal mode of production of curium-242 will be through the short-lived isomer. For purposes of disclosure, it is not critical to the practice of this invention that the curium-242 be formed from only one of the two isomeric forms of mericium-242, but all that is required is that a sufficient quantity of curium-242 be produced which will cause an alpha-neutron reaction with the integrally mixed metal, such as beryllium, to produce a substantial neutron output.

Referring to the accompanying figure, it may be seen that the conversion rate of americium-241 to curium-242 varies over a wide range and is quite high. For example, conversion rates as high as 40% (for neutron fluxes of about $7.5 \times 10^{14}$ n./sec. and an irradiation period of about 40 days) may be obtained. Hence, the irradiation time and the neutron flux may be varied to control the amount of curium-242 produced and conversion of the maximum amount of americium-241 to curium-242 is not a rigid requirement, it being apparent that the longer the americium-241 is exposed to radiation and to higher neutron fluxes, the higher the conversion rates. However, it will be appreciated that irradiation time in a reactor is quite expensive; hence, where size of the source is not a limitation, a large amount of americium-241 may be utilized with shorter irradiation times. Additionally, availability of high neutron fluxes ($>10^{14}$ n./cm.$^2$ sec.) may be a restriction and where encountered it will be obvious that longer irradiation periods would be necessary to arrive at a desired neutron output for a given quantity of americium-241.

To facilitate a better understanding of practicing this invention, an example will be hereinafter discussed. The neutron output obtainable in a given source will depend upon a number of parameters, such as quantity of starting material, neutron flux and exposure time to which the starting material is subjected. To illustrate, assuming a neutron output of at least $10^7$ n./sec. is desired, the starting amount of americium-241 may be calculated as follows. The theoretical yield of a curium-242–beryllium source (based on theoretical yeld of a polonium-210–beryllium source) is $2.8 \times 10^6$ neutrons/second-curie. In order to provide this neutron output about 3.58 curies of curium-242 would be required. The actual yield of such a source is generally estimated to be about 30% of theoretical, therefore requiring ~12 curies of curium-242. The specific activity of curium-242 is 3300 curies/gram (3.3 curies/mg.) and about 3.6 mg. of curium-242 would be required to provide 12 curies. Referring to the accompanying figure, the conversion ratio of americium-241 to curium-242 may be obtained for any set of irradiation times and neutron fluxes. For disclosure purposes it may be seen that for a neutron flux of $2.2 \times 10^{14}$ neutrons/ cm.$^2$-second and an irradiation period of 30 days about 17% of the americium-241 is converted to curium-242. Thus, in order to provide ~3.6 mg. of curium-242, approximately 21 mg. of americium-241 would be necessary. Basing the americium-241 content on americium-241 oxide, about 24.5 mg. of americium-241 oxide would be required as a starting quantity and may be mixed with about 245 mg. of beryllium. It should be apparent that the above-mentioned neutron flux and irradiation time are only illustrative and other sets of nuclear parameters may be employed to achieve a higher or lower conversion ratio for higher or lower neutron fluxes and longer or shorter irradiation periods.

From the above-cited reaction it may be seen that in preparing applicants' novel neutron sources, fission by-products are formed. Inasmuch as the fission products are not removed from the irradiated mixture, the gamma background is higher than would be obtained from sources made from purified curium-242. However, typically less than 5% of the americium-241 is converted to fission products, providing a gamma dose rate of ~10 R./hr. at six inches. Thus, while there is a certain gamma background associated with these sources, it does not adversely affect the utility of these neutron sources. Additionally, transformation of curium-242 to higher actinides and transformation of beryllium (when used) do not have any apparent adverse effect upon the fabricated sources, as regards additional contaminants, etc.

The particle size of the materials to be mixed prior to pressing into a pellet is not critical, but it is preferred that the powder be in a finely divided state, the finer the better. For metals such as beryllium, a particle size of about 200 mesh is suitable, and for americium-241, which is an oxide form, i.e., $Am_2O_3$, a particle size of about 300 mesh is suitable. Whatever the particle size selected, the materials should be mixed thoroughly to give a uniform dispersion of the americium-241 oxide throughout the beryllium metal powder, thus insuring a maximum neutron output for the number of alpha particles emitted, inasmuch as the range of an alpha particle in either americium or beryllium is relatively short. The ratio of Be-to-Am is not critical to the practice of this invention and, while the aforementioned Be-to-Am ratio of 10:1 is greatly preferred due to the self-absorption effects and yield, it should be apparent that other ratios, depending upon the size of the source and output desired, may be used.

The parent material, such as americium-241, is mixed with a metal which is capable of emitting copious neutrons when exposed to alpha radiation. For this, metals such as beryllium, boron or lithium are known in the art (see Principles of Nuclear Engineering by Samuel Glasstone, p. 80, § 2.72) to undergo an alpha-neutron reaction. While neutrons are produced from any of these low-Z materials, the neutron yield is highest from beryllium and is therefore preferred. It may be stated here that any metal which is capable of producing neutrons when exposed to alpha radiation and which is otherwise compatible with nuclear operations, i.e., has a low thermal neutron cross section, is meant to be within the scope of this invention and may therefore be utilized.

Encapsulation of the admixture of parent material and target material, such as beryllium, may be provided with any good structural material, such as aluminum or stainless steel, and may have any desired shape. In general, the container will be in the shape of the pellet to be encapsulated, but whatever the chosen design it must of necessity be capable of being rendered gas-tight. In regard to encapsulation of these sources, they may be encased within a single container or as an additional safety precaution they be doubly encapsulated. For example, the neutron source may be encapsulated in a single aluminum can or, where double encapsulation is desired, the source may be encased first in an aluminum can and then stainless steel or doubly encapsulated in stainless steel. To insure maximum safety applicants prefer that the sources be doubly encapsulated. For this the source may be first encased in aluminum, then irradiated to activate the source (convert the americium-241 to curium-242) and thereafter the irradiated source may be encapsulated in a stainless steel can. It will be appreciated that this second encapsulation will, due to the high neutron output of the activated source, require neutron shielding and may conveniently be accomplished in a hot cell. Where the source is encapsulated in stainless steel prior to irradiation, hot cell equipment is not needed at any point in the fabrication. This, however, increases the gamma dose rate from the source because of the induced radioactivity in the stainless steel capsules.

Although the americium-241 is toxic, as are other known alpha emitters, the fabrication of the americium-241 and the beryllium into a pellet prior to irradiation may be safely effected with no greater protection than a glove box. This is attributed to the fact that the americium-241-beryllium alpha-neutron reaction produces only a relatively low neutron output, as for example 11 mg. of americium-241 yields about $5 \times 10^3$ n./sec., with the neutrons having an average energy of approximately 4.5 mev. Thus, as much as approximately 100 mg. of americium-241, which if irradiated would provide a neutron output of $<10^8$ n./sec., could be safely handled with no greater protection than a glove box. In contradistinction prior art sources, such as polonium-210-beryllium, require neutron shielding during the fabrication of the source (i.e., mixing of the two constituents) where the obtained neutron output exceeds $10^6$ n./sec.

Separation of the formed curium-242 from fission by-products or unconverted americium is not required in applicants' process in order to provide a suitably high-output neutron source. This is attributable to the fact that the conversion ratio of americium-241 to curium-242 is quite high, resulting in milligram quantities of curium-242 being produced from milligram batches of americium-241. While it may be desired to convert the maximum amount of the starting material, such as americium-241, to the high specific activity alpha emitting material initially, it is not a rigid requirement and may be varied depending upon the requirements of the desired neutron source. As a special point this versatility affords additional benefits in fabricating neutron sources by this method. This method provides for periodic re-activation of the source if desired. For instance, if it is desirable to maintain a moderate neutron output for an extended period of time, the original source may be provided with an excess of americium-241 and only a portion of the available americium be converted to yield the desired neutron output. Later, when the neutron output decreases below the desired value, the source may be re-irradiated to convert additional americium-241 to curium-242 to maintain the the desired neutron output. This may be repeated until maximum conversion has been achieved, providing, of course, that the capsule has not lost its integrity. It will be apparent, however, that as the number of desired re-irradiations increases, the size of the source increases due to the increased quantity of starting material. From a practical standpoint it may be desirable to design the source for only one re-irradiation.

It will be apparent that while the present invention was described with particular reference to an americium-241-beryllium-curium-242 neutron source, other radioactive elements such as neptunium-237 are equally suitable starting materials and may yield certain additional benefits. Neptunium-237 may be converted by neutron bombardment to plutonium-238, which is a relatively high specific alpha emitter. Inasmuch as the plutonium-238 has a longer half-life than curium-242 (89 years vs. 162 days), sources made from neptunium-237 and beryllium would not have to be calibrated as frequently as those made with americium-241. Also, there are essentially no neutrons generated when neptunium-237 is mixed with beryllium.

Further illustration of the quantitative aspects and procedures of the present invention is provided in the following examples. Example I demonstrates the method of preparing an americium-241-beryllium-curium-242 source.

EXAMPLE I

An $^{241}$Am-Be-$^{242}$Cm neutron source was prepared by mixing 11 mg. of powdered americium-241 oxide which had a particle size of approximately 300 mesh with ½-gram of powdered beryllium metal which had a particle size of approximately 200 mesh. Greater than a 10:1 ratio of Be-to-Am was used in order to increase the pellet size for easier handling. The mixture was pressed into a pellet whose finished measurements were 0.6 cm. in diameter and 1.1 cm. in length. The pellet was then encapsulated in aluminum, welded closed and leak-tested in water. The pellet was then placed in the Oak Ridge Research Reactor and irradiated in a neutron flux of $3.49 \times 10^{14}$ neutrons/sec./cm.$^2$ for a period of eight weeks. Post-irradiation analysis of the pellet employing a BF$_3$ tube indicated that approximately 36% of the $^{241}$Am was converted to $^{242}$Cm, yielding a neutron output of $1.15 \times 10^7$ n./sec. Also, approximately 5% of the americium-241 was converted to fission products which were not removed and which provided a gamma does rate of $\sim$10 R./hr. at six inches.

Example II shows that an initial source of *only* 11 mg. of americium-241 can yield a moderately high neutron output which is comparable to the output of the prior art neutron sources.

EXAMPLE II

An $^{241}$Am-Be-$^{242}$Cm neutron source was prepared using the same procedure employed in Example I, except it was exposed to a neutron flux of $2.5 \times 10^{14}$ n./sec./cm.$^2$ for 30 days. Also, after irradiation of the source it was encapsulated in a stainless steel can. Analysis of the source indicated that approximately 21% of the $^{241}$Am was converted to $^{242}$Cm with approximately 5% of the $^{241}$Am being converted to fission products which were not removed. The gamma dose rate from these fission products was $\sim$5.5 R./hr. at six inches and the neutron output was $3.86 \times 10^6$ n./sec.

Example III shows a high-output americium-241-beryllium-curium-242 neutron source.

EXAMPLE III

A 1000-curie neutron source of $^{241}$Am-Be-$^{242}$Cm may be prepared by mixing 1000 mg. of powdered americium-241 oxide (300 mesh) with 10,000 mg. of powdered beryllium metal (200 mesh). The resulting mixture is pressed into a pellet and encapsulated in a container as described in Example I. The encapsulated pellet is placed in a nuclear reactor, such as the Oak Ridge Research Reactor, and irradiated in a neutron flux of $3.49 \times 10^{14}$ n./sec./cm.$^2$ for an eight-week period, which is calculated to yield maximum conversion of the americium-241 to curium-242. The neutron output of this 1000-curie source should be approximately $4 \times 10^9$ n./sec.

It is therefore to be understood that all matters contained in the above description and examples are illustrative only and do not limit the scope of the present invention.

What is claimed is:

1. A high-output neutron source of the alpha-neutron reaction type comprising an admixture of a first parent element selected from the group consisting of americium-241 and neptunium-237, a target metal selected from the group consisting of boron and beryllium, and a second element selected from the group consisting of curium-242 and plutonium-238, said second element being produced in situ by neutron irradiation for a period of time sufficient to convert at least 21% of said first element to said second element.

2. The neutron source of claim 1 wherein said admixture comprises americium-241, beryllium and curium-242.

References Cited

UNITED STATES PATENTS

| | | | |
|---|---|---|---|
| 2,440,999 | 5/1948 | Anderson | 252—301.1 |
| 2,592,115 | 4/1952 | Carrol | 176—10 |
| 2,868,990 | 1/1959 | Reardon et al. | 176—10 |
| 3,269,915 | 8/1966 | Ransohoff et al. | 176—10 |

OTHER REFERENCES

Strain et al., Preparation and Uses of Alpha, Gamma, and Neutron Sources, from Am 241, Feb. 18, 1960, p. 32, ORNL–2866.

AEC Document JLI–2748–0–7, 1962, pp. 54–56, 59–61, 63 and 65–67.

Arnold, Effect of Uranium Recycle on Transuranic Element Buildup, Nuclear Science & Eng.: 3, June 1958, pp. 707, 717, 718, 719.

Transactions of American Nuclear Society, vol. 7, January 1964, pp. 132–133.

CARL D. QUARFORTH, *Primary Examiner.*

L. DEWAYNE RUTLEDGE, BENJAMIN R. PADGETT, *Examiners.*

H. E. BEHREND, *Assistant Examiner.*